United States Patent
Maciel (10) Patent No.: US 7,143,256 B2
(45) Date of Patent: Nov. 28, 2006

(54) SHARED STORAGE DEVICE AND METHOD FOR UPDATING CONTENTS OF THE SAME

(75) Inventor: Frederico Buchholz Maciel, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 849 days.

(21) Appl. No.: 10/226,152

(22) Filed: Aug. 23, 2002

(65) Prior Publication Data

US 2003/0191840 A1    Oct. 9, 2003

(30) Foreign Application Priority Data

Apr. 8, 2002    (JP)    ............... 2002-104965

(51) Int. Cl.
*G06F 12/00*    (2006.01)

(52) U.S. Cl. ............... 711/165; 711/162; 711/114

(58) Field of Classification Search ............... None
See application file for complete search history.

(56) References Cited

U.S. PATENT DOCUMENTS

| | | | | |
|---|---|---|---|---|
| 5,950,230 A | * | 9/1999 | Islam et al. ............... | 711/156 |
| 6,058,455 A | * | 5/2000 | Islam et al. ............... | 711/114 |
| 6,567,811 B1 | * | 5/2003 | Edwards et al. ............ | 707/100 |
| 6,745,207 B1 | * | 6/2004 | Reuter et al. ............... | 707/200 |

OTHER PUBLICATIONS http://www.hitachi.co.jp/Prod/comp/storage/diskarray/what#san/nas.html.
ftp://download.intel.com/ebusiness/pdf/prod/infiniband/wp012501.pdf.
"Building Storage Networks", ISBN 0-07-212050-9.

* cited by examiner

*Primary Examiner*—Kevin Verbrugge
(74) *Attorney, Agent, or Firm*—Mattingly, Stanger, Malur & Brundidge, P.C.

(57) ABSTRACT

A storage apparatus and a storage method for decreasing the number of storage devices shared by a plurality of servers for reduced size and power consumption and for updating storage contents by preventing services from being degraded. A first virtual volume includes a plurality of storage devices and saves the same data in part or all of the storage devices. A virtualization engine detaches a storage device from the first virtual volume and generates a second virtual volume from the detached storage device. The virtualization engine further detaches a storage device from the first virtual volume and moves the detached storage device to the second virtual volume. The virtualization engine writes the difference between data saved in the first and second virtual volumes to the moved storage device.

7 Claims, 12 Drawing Sheets

OLD CONTENTS          NEW CONTENTS

SHARED STORAGE DEVICE AND METHOD FOR UPDATING CONTENTS OF THE SAME

BACKGROUND OF THE INVENTION

The present invention relates to a storage mechanism and more particularly to the update of contents stored in shared storage.

Normally, a data center connected to the Internet has a plurality of layers.

Figure 15:
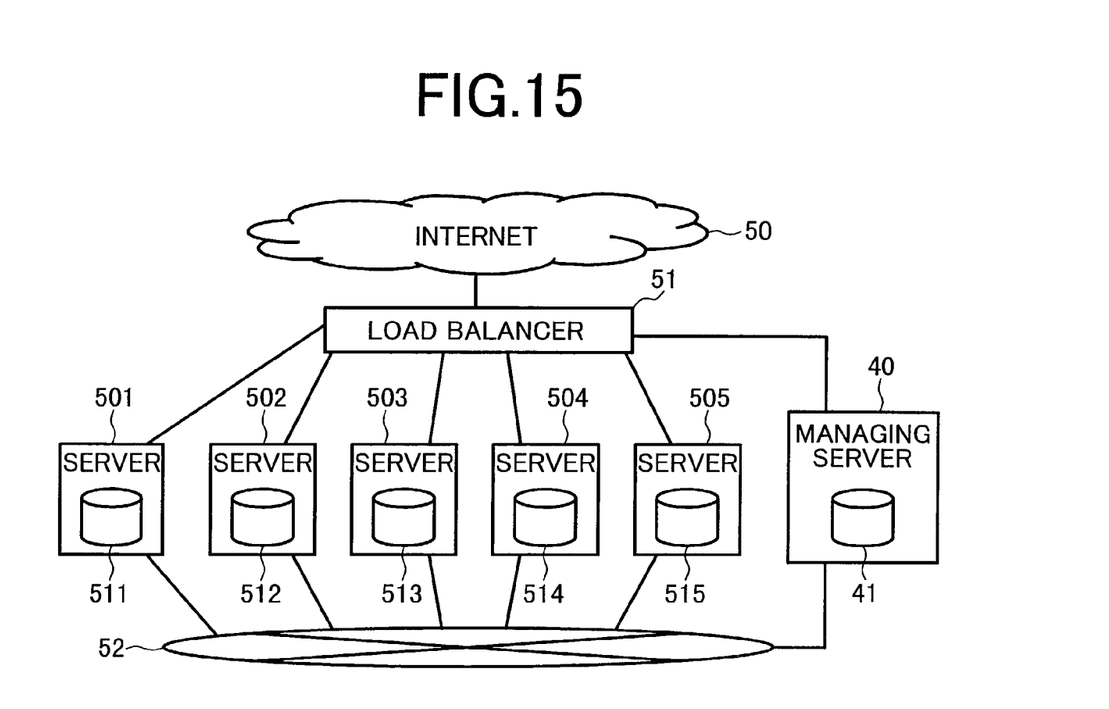
FIG. 15 is a schematic configuration diagram showing a conventional example of a Web site having a plurality of servers having storage devices.

FIG. 15 shows the configuration of the so-called front-end layer, i.e., the layer nearest to the Internet. A load balancer 51 distributes accesses from Internet 50 to a plurality of servers 501 through 505.

The servers 501 through 505 provide services such as Web, FTP, etc. The servers 501 through 505 are respectively equipped with storage devices 511 through 515 having one or more hard disks. The storage devices 511 through 515 store the contents of each Web site, FTP site, etc. (hereafter simply referred to as a site) processed by the data center.

A managing server 40 managing the servers 501 through 505 has a storage device 41 having one or more hard disks. The storage device 41 contains the master copy of the site contents. When the master copy is updated, the managing server 40 updates the contents of the servers 501 through 505. (Hereinafter, the updated contents are referred to as the "new contents" and the contents before update are referred to as the "old contents".)

Various kinds of errors may occur if the servers 501 through 505 are accessed while the contents are being updated. Therefore, the managing server 40 updates the contents according to the following procedure.

First, the setting of the load balancer 51 is changed to detach the server 501 from the site. (Thereafter, no accesses are transferred to the server 501 from the Internet 50.)

The managing server 40 copies the new contents (or the difference between the old and new contents) from the storage device 41 to the storage device 511 of the server 501.

Finally, the setting of the load balancer 51 is restored to reattach the server 501 to the site. The managing server 40 repeats the above-mentioned three steps for the servers 502 through 505 to update the contents of the entire site. Since the servers 502 through 505 are updated one by one, the site can be accessed during the update. The site performance degrades just by the performance of one of the servers 501 through 505.

Recently, the density of the servers 501 through 505 has been increasing. However, the improvement of the density becomes restricted if the respective servers 501 through 505 contain storage devices 511 through 515. Also, in recent years, electric power consumption has increasingly become an issue for data centers and sites that manage a plurality of servers as mentioned above. Therefore, there has been an increasing demand for reducing the power consumption.

The aggregation of storage devices is disclosed in, for example, the following documents:

http://www.hitachi.co.jp/Prod/comp/storage/diskarray/what#san/nas.html (hereafter referred to as document 1) and ftp://download.intel.com/ebusiness/pdf/prod/infiniband/wp012501.pdf (hereafter referred to as document 2). As described in these documents, it is known that a plurality of servers having no local storage devices can share one storage device via, for example, a network. Since each server is not provided with a storage device, it is possible to decrease the electric power consumed by these servers (and the power needed for cooling the computer system), and it is also possible to improve the density of arranging servers in, for instance, a data center by reducing their size.

While the latter prior art disclosed in documents 1 and 2 has advantages over the prior art as shown in FIG. 15, updating the contents stored in the storage device becomes a problem. Specifically, in the latter example where a plurality of servers share a volume of the storage device being shared, when updating contents of the volume in this case, all servers accessing that volume must be detached from the site. This greatly decreases the site performance or even makes the whole site unavailable.

To solve this problem, the new contents need to be stored in a volume separate from the volume of the old contents, and then the volume accessed by each server is changed from the latter volume to the former volume. In this case, separate volumes for the new and old contents are needed. The volume for the new contents must be allocated on a physical storage device, increasing the capacity needed on the storage device. Therefore, even if the server does not contain storage devices, the capacity or the number of storage devices increases. This prevents the decrease in the total power consumption of the server and storage devices, and the increase in the density of the servers from the reduction in their size.

SUMMARY OF THE INVENTION

The present invention has been made in consideration of the foregoing. It is therefore an object of the present invention to promote the reduction in size and power consumption of a system by decreasing the number of storage devices shared by a plurality of servers, and to update the stored contents by preventing the quality of service from degrading.

Figure 2:
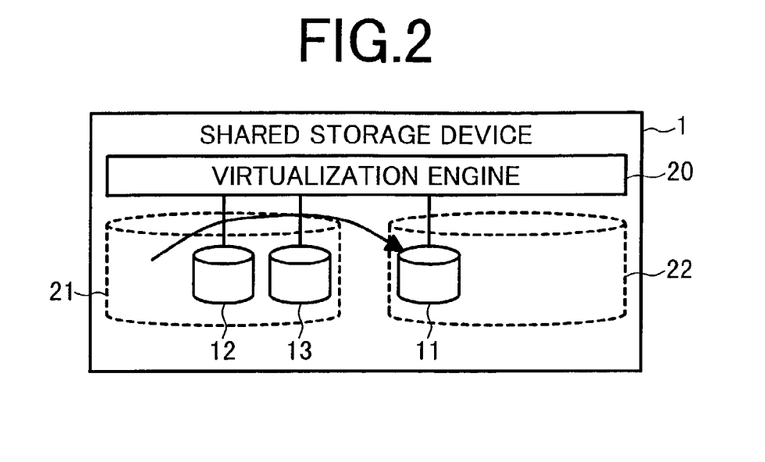
FIG. 2 is an explanatory diagram showing the state in which virtual volumes are generated in a shared storage device and one storage device is moved.
Figure 16:
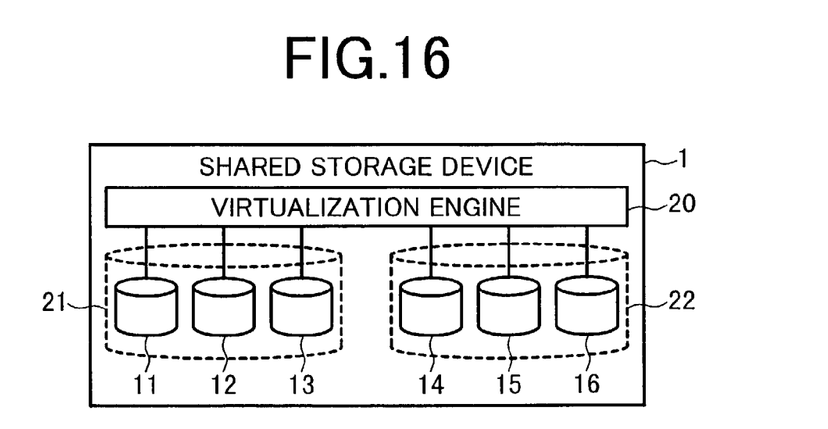
FIG. 16 is a schematic configuration diagram showing the case in which storage devices are provided for each virtual volume.

To solve the above-mentioned problem of updating contents, in one preferred aspect, the present invention generates a virtual volume 22 (second volume). This virtual volume 22 is implemented by using storage devices (i.e., storage means) 11 through 13 of the virtual volume 21 (first volume) as shown in FIG. 2, instead of using storage devices 14 through 16 (i.e., storage devices separate from the ones of virtual volume 21) as shown in FIG. 16. The storage devices 11 through 13 are gradually moved to the virtual volume 22 from the virtual volume 21. The differences on the data stored in the virtual volumes 21 and 22 are written to the storage devices moved to the virtual volume 22.

According to the present invention, data in a virtual volume 21 is updated by moving the storage means to a newly generated virtual volume 22 for writing the data difference. A smaller number of disks are used to update data (contents). Accordingly, it is possible to prevent the entire system performance from degrading, thus improving the density of the system including the shared storage device having the virtual volumes 21 and 22, reducing the power consumption thereof, while maintaining the system's quality of service.

Other and further objects, features and advantages of the invention will appear more fully from the following description.

DETAILED DESCRIPTION OF THE PREFERRED EMBODIMENTS

An embodiment of the present invention will be described in further detail with reference to the accompanying drawings.

Figure 1:
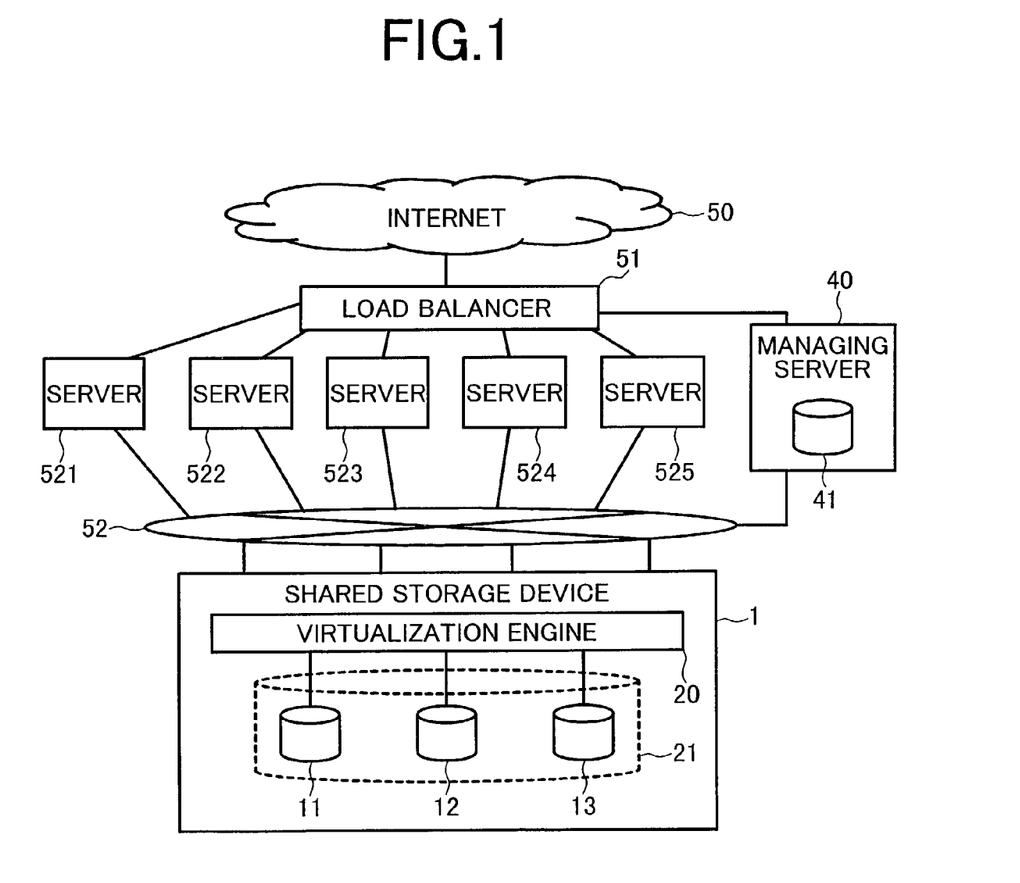
FIG. 1 is the schematic configuration diagram of a Web site showing an embodiment of the present invention.

FIG. 1 shows an example of the present invention applied to a Web site (hereafter referred to as a site). The Web side has a load balancer (path control means) 51, a storage device 1, and a managing server 40. The load balancer 51 distributes accesses from Internet 50 to a plurality of servers (information processing devices) 521 through 525. The storage device 1 stores contents provided by the servers 521 through 525. The managing server 40 manages the servers 521 through 525 and the storage device 1.

In FIG. 1, the servers 521 through 525 have no storage devices. Instead, the servers 521 through 525 share the shared storage device 1. The storage device 1 contains a virtual volume 21 storing contents of the Web site. Each of servers 521 through 525 accesses the virtual volume 21. The servers 521 through 525 and the shared storage device 1 are connected via an internal network 52.

The virtual volume 21 is accessed from the plurality of servers 521 through 525. Accordingly, this requires from the virtual volume 21 a performance equivalent to the sum of the performances of the storage devices 511 through 515 shown in FIG. 15 on the conventional example.

By contrast, the virtual volume 21 has the same contents as for the storage devices 511 through 515 shown in FIG. 15 for the above-mentioned conventional example. Therefore, the same capacity suffices. For this reason, the virtual volume 21 can be configured as RAID-1, also referred to as mirroring (see "Building Storage Networks", ISBN 0-07-212050-9, hereafter referred to as document 3).

In order for the servers 521 through 525 to share the shared storage device 1, it is provided with a virtualization engine (software and/or hardware for virtualization) 20. The virtualization engine 20 implements the virtual volume 21 from storage devices 11 through 13 according to the RAID-1 configuration.

The virtualization engine 20 caches contents of the virtual volume 21 and performs optimization among storage devices 11 through 13 such as distributing accesses to the virtual volume 21 among storage devices 11 through 13. The cache and the optimization improve the input/output efficiency. For example, three storage devices 11 through 13 can provide the performance needed for the five servers 521 through 525 as shown in FIG. 1. The elimination of the local storage devices from the servers 521 through 525 results in an increase in the front-end layer density and a reduction in the power consumption.

The virtualization engine 20 of the shared storage device 1 responds to commands from managing software of the managing server 40 to create or delete a virtual volume, or move a storage device between volumes. In response to an access from the servers 521 through 525, the virtualization engine 20 reads data (contents).

The following describes the updating of the contents stored in the virtual volume 21 of the shared storage device 1.

Figure 3:
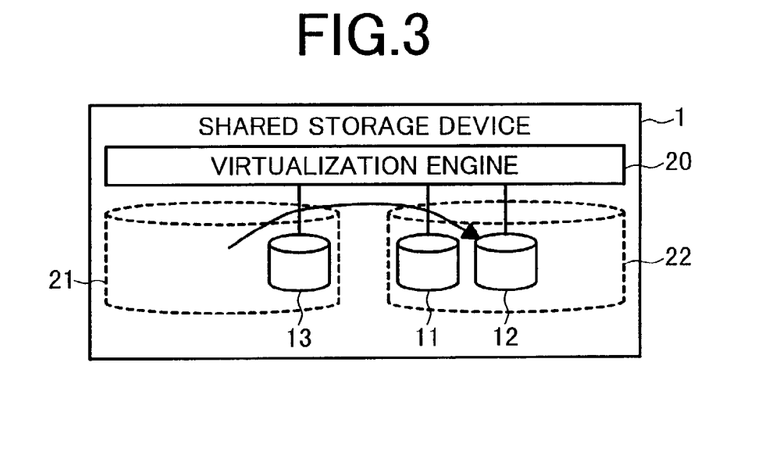
FIG. 3 is an explanatory diagram showing the state in which another storage device is moved to the generated virtual volume.
Figure 4:
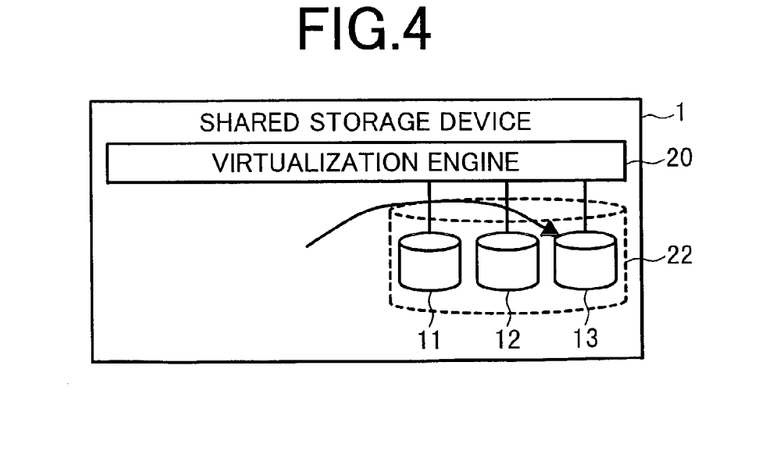
FIG. 4 is an explanatory diagram showing the state in which all storage devices are moved to the generated virtual volume and the volume storing old contents is deleted.

FIGS. 2 through 4 outlines the update of the contents. Executing a command from the managing server 40, the virtualization engine 20 creates the virtual volume 22. The managing server 40 moves storage devices to the new virtual volume 22. After the storage devices have been moved, the virtualization engine 20 deletes the virtual volume 21, which stored the old contents.

In FIG. 2, the new virtual volume 22 is created to store new contents. The storage device 11 in the existing virtual volume 21 is moved to the new virtual volume 22. In other words, the volume to which the storage device 11 belongs is changed from the existing virtual volume 21 to the newly created virtual volume 22.

At this point, the virtual volume 22 has the same contents of the storage device 11, and consequently the virtual volumes 21 and 22 have the same contents.

Thereafter, the managing server 40 copies the difference between the old and new contents to the virtual volume 22. Here, the difference between old and new contents is written to the storage device 11 in the virtual volume 22. At this point, the virtual volume 22 stores the new contents.

The managing server 40 sequentially issues commands to the load balancer 51 to detach (disconnect) the servers 521 through 525 one by one from the site for updating the contents provided by these servers. While detached from the site, the servers 521 through 525 (or the managing server 40, by issuing commands to the servers 521 through 525) change the volume being accessed from the old contents (virtual volume 21) to the new contents (virtual volume 22). To detach a server from the site, the managing server 40 commands the load balancer 51 to change the setting.

When the change of the virtual volume is complete on each of the servers 521 through 525 (i.e., this server is now accessing the new contents in virtual volume 22), the managing server 40 commands the load balancer 51 to reattach this server to the site.

In this manner, the managing server 40 updates contents provided by the servers 521 through 525. That is, the managing server 40 changes contents accessed by the servers 521 through 525 one by one from the virtual volume 21 to the virtual volume 22.

When the number of servers accessing the new contents (data in the virtual volume 22) increases, the managing server 40 further moves the storage device 12 to the virtual volume 22 as shown in FIG. 3. This movement is the same as mentioned above, i.e., the volume to which the storage device 12 belongs is changed from the virtual volume 21 to the virtual volume 22.

At this point, the storage device 12 stores the old contents (data equal to the virtual volume 21). In order to update the contents of the storage device 12 to the new contents, the virtualization engine 20 performs the operation of writing the difference between the old and new contents from the storage device 11 to the storage device 12.

This operation makes the contents of the storage device 12 equal to the one of the storage device 11, enabling RAID-1 operation on the virtual volume 22.

Finally, as shown in FIG. 4, the storage device 13 is moved to the virtual volume 22. At this time, as mentioned above, the storage devices 11 and 12 are used to write the difference between the old and new contents to the storage device 13. Thereafter, the virtual volume 21 is removed since no storage devices remain in the virtual volume 21.

The following sequence provides an example of the above-mentioned update procedure. (In the following procedure, the steps of changing servers to the virtual volume 22 include the steps of detaching and reattaching these servers to the load balancer 51.)

(1) Create the virtual volume 22 (FIG. 2).
(2) Change the server 521 to the virtual volume 22.
(3) Change the server 522 to the virtual volume 22.
(4) Move the storage device 12 to the virtual volume 22 (FIG. 3).
(5) Change the server 523 to the virtual volume 22.
(6) Change the server 524 to the virtual volume 22.
(7) Change the server 525 to the virtual volume 22.
(8) Move the storage device 13 to the virtual volume 22 (FIG. 4).

As mentioned above, when the storage devices 12 through 13 are moved to the new virtual volume 22 from the virtual volume 21, the difference between the old and new contents are written to the storage devices 12 through 13.

The conventional RAID-1 method is extended for this writing. The following explanation describes the conventional RAID-1 method followed by the method according to the present invention.

Figure 5:
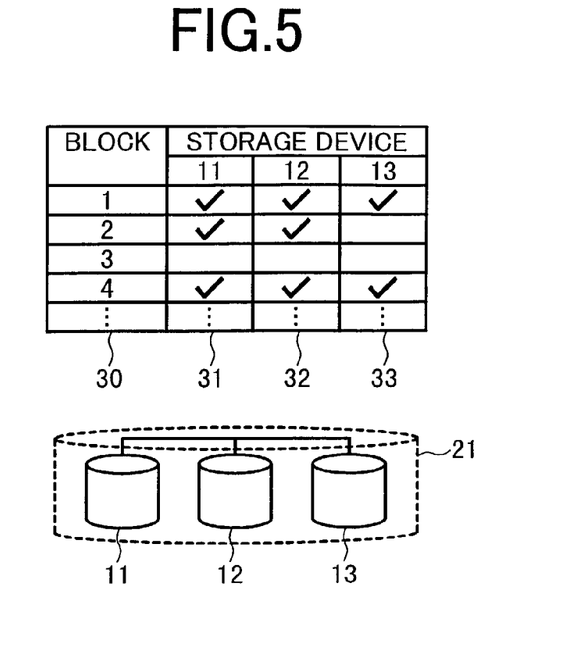
FIG. 5 is an explanatory diagram showing the conventional operation of RAID-1 and the relationship among storage devices and the update table.

The operation of the conventional RAID-1 will be described referring to FIGS. 1 and 5 (FIG. 5 relates to the state in FIG. 1).

When the contents are updated (i.e., data is written) to the virtual volume 21, the virtualization engine 20 writes the data to the storage devices 11 through 13.

The virtualization engine 20 maintains an update table 30 through 33 to manage the state of writing to the virtual volume 21. In FIG. 5, check marks in the update table 30 through 33 signify that the writing is complete for the corresponding block 30 of the corresponding storage devices 11 through 13.

When data is written to the virtual volume 21, the virtualization engine 20 clears all the check marks for the blocks to be written, and then writes data to each storage device. The write operations do not take place simultaneously because of different response times of the storage devices, and also by the selection of the execution sequence (scheduling) of a plurality of update and read operations in the storage devices 11 through 13 for improving the performance. Consequently, in a given instant, a given block 30 in the update tables 30 through 33 may be updated in some storage devices and unupdated in other storage devices. In FIG. 5, block 2 is an example of this case.

When data is read from the virtual volume 21, if this data is not cached, it can be read from the storage devices 11 through 13 which have check marks on the blocks to be read.

The above-mentioned operations enable not only update management, but also temporary detachment of the storage devices 11 through 13 from the virtual volume 21.

This temporary detachment is useful, for example, to back up a snapshot of contents while the virtual volume 21 is updated. An example is to detach the storage device 11 from the virtual volume 21, copy data from the storage device 11 to a backup device such as a tape, and reattach the storage device 11 to the virtual volume 21.

The update management continues operating on column 31 while the storage device 11 is detached. When the virtual volume 21 is updated during this period, check marks are cleared from column 31. When the storage device 11 is reattached, the corresponding blocks are updated (see document 3).

Figure 6:
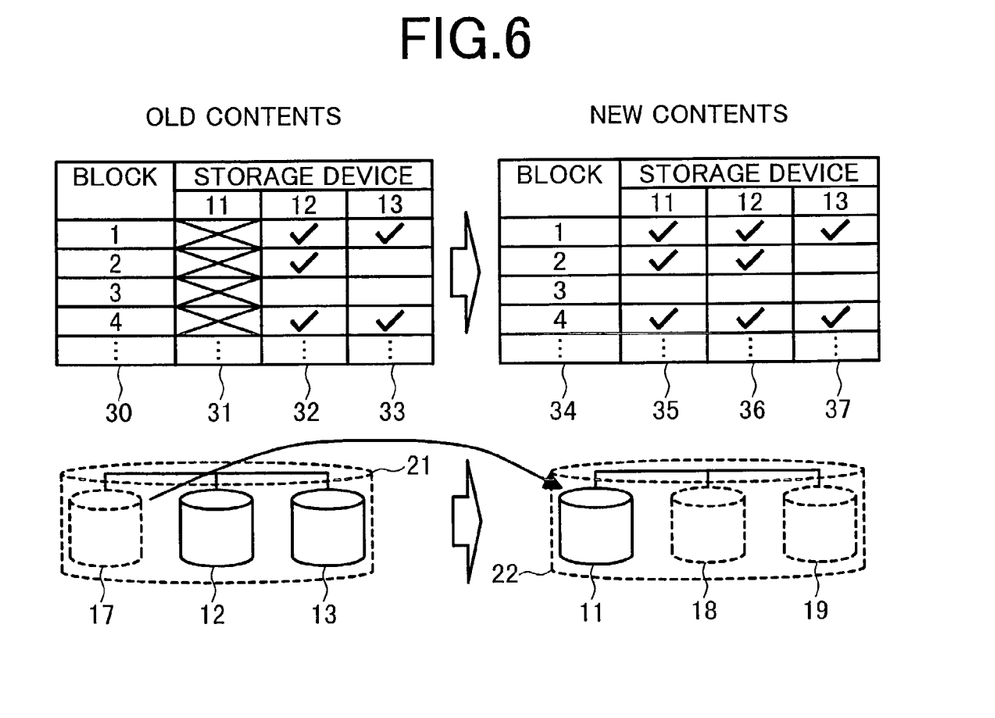
FIG. 6 is an explanatory diagram showing the operation of RAID-1 according to the present invention and relationship among volumes, storage devices, and the update table.

The conventional operation of RAID-1 has been described above. Referring now to FIG. 6, the operation of the present invention will be described. (FIG. 6 relates to the state in FIG. 2. FIG. 6 contains symbols drawn with dotted lines corresponding to reference numerals 17, 18, and 19. These symbols illustrate empty slots in the shared storage device 1, not virtual volumes or storage devices.) When creating the virtual volume 22, the virtualization engine 20 according to the present invention copies the update table 30 through 33 at that point in time to create the update table 34 through 37 for the new virtual volume 22.

When all the storage devices 11 through 13 are moved to the virtual volume 22 as shown in FIG. 4, the update table 30 through 33 is removed together with the virtual volume 21.

The virtualization engine 20 disables the column (column 31 in FIG. 6) (by placing cross marks (X) in FIG. 6) in the virtual volume 21 corresponding to the storage device (the storage device 11 in FIG. 6) to be moved to the virtual volume 22. No check marks are updated in that column thereafter.

It is assumed that storage devices exist in the empty slots (empty slots 18 and 19 in FIG. 6) in the virtual volume 22 corresponding to yet unmoved storage devices (the storage devices 12 and 13 in FIG. 6). Based on this assumption, their columns (columns 36 and 37 in FIG. 6) in the update table are updated conventionally.

When data is written to the virtual volume 22, the check marks are cleared on the empty slots 18 and 19. However, since writing data onto these slots is not possible, no check marks are written. Moving a storage device to the virtual volume 22 updates all blocks having no check marks. Only the updated blocks (i.e., the data difference between the old and new contents) are written to the moved storage device.

Apart from the data difference above, this operation also writes data not written on the virtual volume 21 (i.e., blocks without check marks) when the virtual volume 22 was created. If this data was already written when the storage device was on the virtual volume 21, duplicate writing (i.e., writing twice the same data) occurs. When the virtual volume is created, however, it is expected that the virtual volume 21 contains no, or very few, blocks that are not updated. Therefore the decrease in the performance due to duplicate writing is small.

In the movement of the storage devices 11 through 13 according to the present invention, these storage devices 11 through 13 are sequentially added to the virtual volume 22 (which stores the new contents) from the virtual volume 21 (which stores the old contents). Data is written to the storage devices 12 through 13 based on the above-mentioned update table so they store the updated contents.

Figure 7:
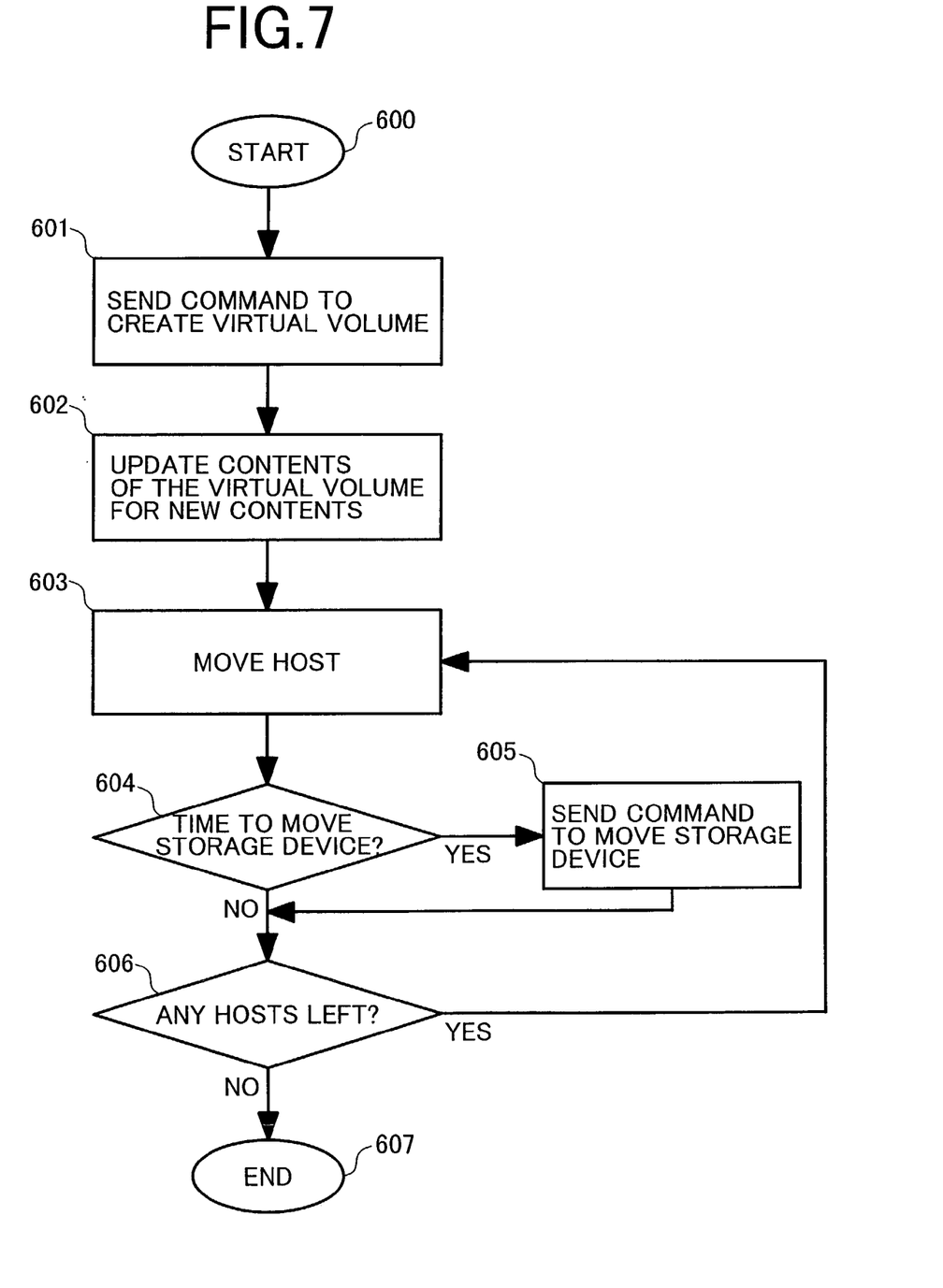
FIG. 7 is a flowchart showing an example of the processing in the managing server.

With reference to the flowchart in FIG. 7, the following describes how managing software for the managing server 40 updates contents. The process on the flowchart in FIG. 7 is executed when there is a request to update the contents from the Internet 50 or when the managing server 40 updates the contents. Here, it is assumed that the storage device 41 in the managing server 40 already contains the new contents to be updated.

At step 601, the managing server 40 sends a command for creating the new virtual volume 22 (see FIG. 2) to the virtualization engine 20 in the shared storage device 1.

At step 602, the managing server 40 writes the difference between new and old contents to the virtual volume 22. At this time, the virtual volume 22 stores the new contents.

At step 603, the managing server 40 sends commands to a server 521 through 525 and to the load balancer 51, so that this server (host) 521 through 525, which is accessing the virtual volume 21 (old contents) in the shared storage device 1, accesses the newly created virtual volume 22 (new contents).

This step 603 includes the following three processes corresponding to the above-mentioned steps (2), (3), and (5) through (7).

(A) Command the load balancer 51 to detach one server from the site.

(B) Command the server detached from the site to change the volume to be accessed from the virtual volume 21 to the virtual volume 22.

(C) Command the load balancer 51 to reconnect the server which had been detached.

In brief, the above-mentioned processes (A) through (C) changes the volume to be accessed by this server to the virtual volume 22 containing the updated contents while the server is detached from the site.

At step 604, it is decided whether or not a storage device 11 through 13 should be moved from the virtual volume 21 to the virtual volume 22.

This decision is based, for instance, on the loads of the virtual volumes 21 and 21, or on the number of storage devices on each of these virtual volumes 21 and 22. The following equation is an example of a calculation that can be used to make this decision:

Here, the number of connected servers was used as the load on the virtual storage device, but is not limited thereto. This load may be not only the number of hosts (servers), but also for instance the access load (the number of bytes per second).

At step 605, a command is issued to the virtualization engine 20 in the shared storage device 1 so as to move a storage device from the virtual volume 21 to the new virtual volume 22.

At step 606 it is determined whether or not there are any servers accessing the virtual volume 21 ( which stores the old contents). If there are any servers accessing the virtual volume 21, the process proceeds to step 603 to change the access the virtual volume 22.

As mentioned above, the managing software on the managing server 40 firstly commands the shared storage device 1 to create an virtual volume. The managing software 60 then writes the contents to be updated or a difference thereof from the storage device 41 to the shared storage device 1. Then, depending on the load on each virtual volume, the managing software 60 moves the storage devices 12 through 13 in the shared storage device 1 to the virtual volume 22 and updates their contents. The servers are sequentially disconnected from the site by the load balancer 51 and the virtual volumes that they access are changed.

Figure 8:
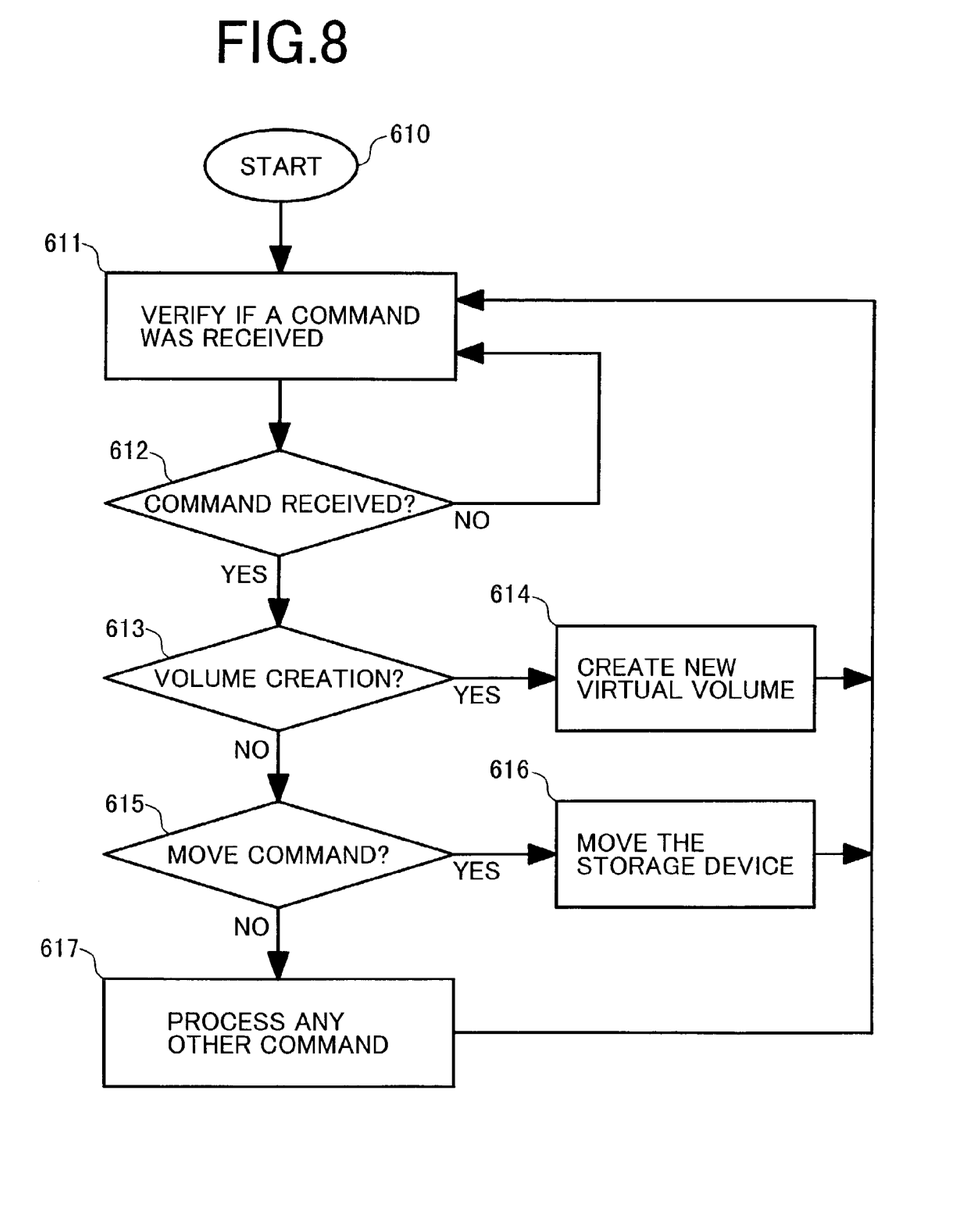
FIG. 8 is a flowchart showing an example of the main routine of the processing in the virtualization engine.
Figure 9:
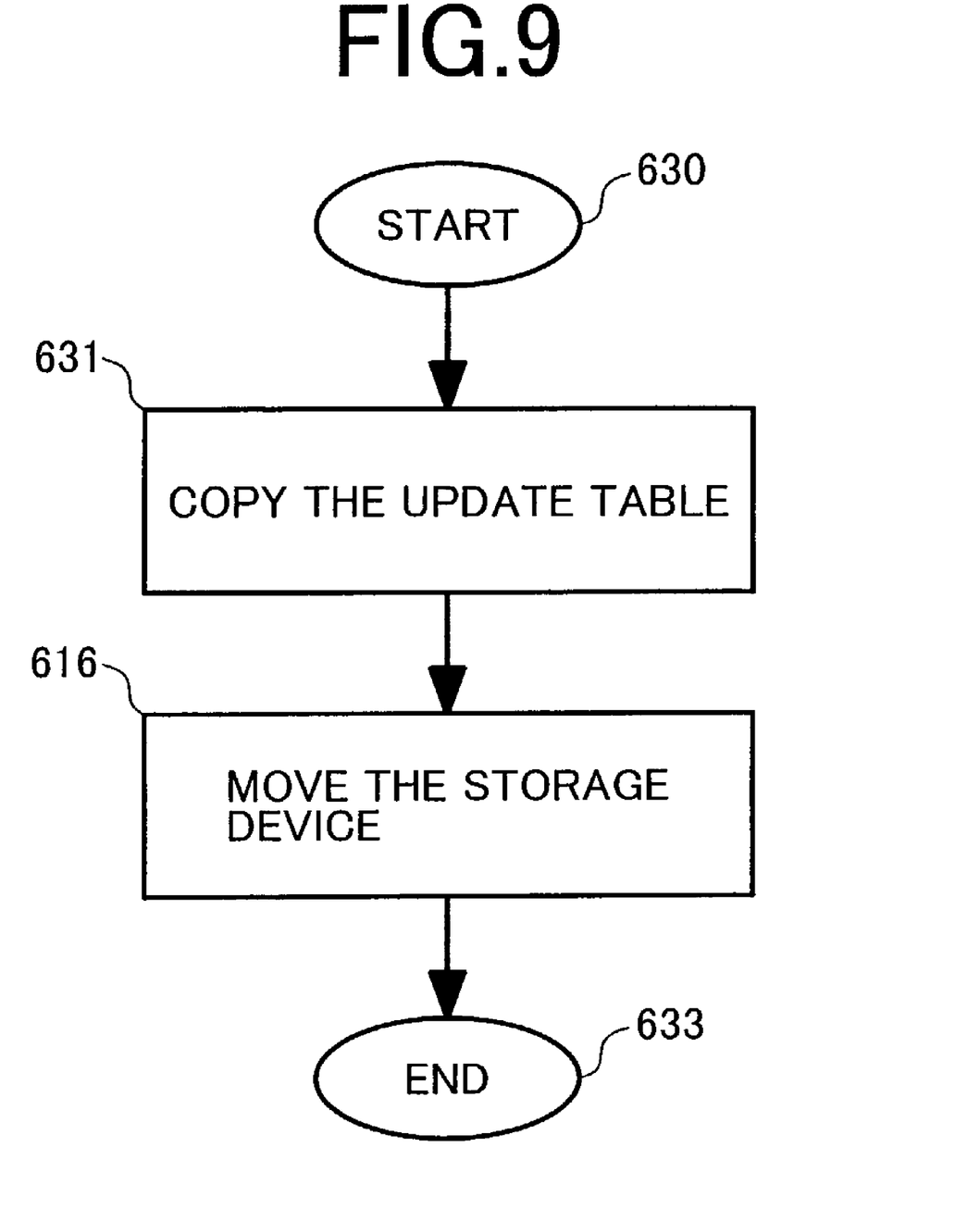
FIG. 9 is a flowchart showing the processing in the virtualization engine for creating the new volume.
Figure 10:
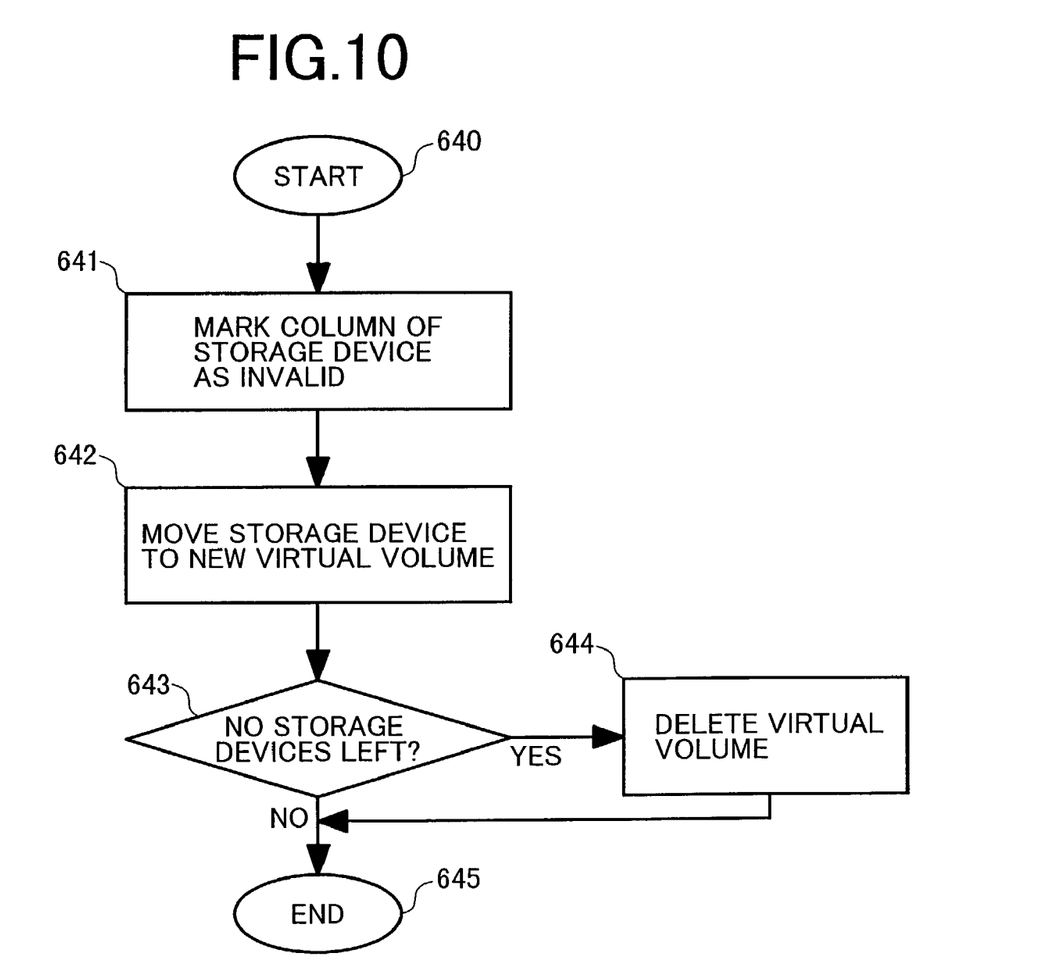
FIG. 10 is a flowchart showing the processing in the virtualization engine for moving a storage device.

Now referring to FIGS. 8 through 10, the following describes an example of processing performed in the virtualization engine 20 in the shared storage device 1.

FIG. 8 shows a process flow for the virtualization engine 20. FIG. 9 shows a process flow for creating a new volume. FIG. 10 shows a process flow for moving storage devices.

In FIG. 8, the process waits for a command from the managing server 40 at steps 611 and 612. At step 613, it is determined whether or not the received command is a command to create a new volume. At step 615, it is determined whether or not the received command is a command to move a storage device.

When a command for creating a new volume is received, the process proceeds to step 614 to create a new virtual volume. When a command for moving a storage device is received, the process proceeds to step 616 to move storage devices 12 through 13 from the virtual volume 21 to the virtual volume 22.

When any other commands are received, the process associated with this command is performed at step 617. These other commands include the command to detach storage devices from the virtual volume, the command to reattach them, etc., according to the prior art mentioned above.

The repetition of the above-mentioned steps 611 through 617 processes the commands from the managing server 40.

$$\frac{\text{load on virtual volume 21}}{\text{number of storage devices in the virtual volume 21}} < \frac{\text{load on virtual volume 22}}{\text{number of storage devices in the virtual volume 21}} \qquad \text{Eq. (1)}$$

When this equation is satisfied, the process proceeds to step 605 to move a storage device 11 through 13. Otherwise, the process proceeds to step 606. However, if the number of connected servers is used as the load for the virtual volumes 21 and 22, on the last storage device in the virtual volume 21, the process proceeds to step 606 unless the load (i.e., the number of connected servers) is 0.

With reference to the flowchart in FIG. 9, the following describes the process for creating a new volume at the above-mentioned step 614.

At step 631 in FIG. 9, the virtual volume 22 is created in the shared storage device 1 for storing the updated contents. In addition, as shown in FIG. 6, the update tables 30 through 33 are copied to create the new update tables 34 through 37.

At step 616, the storage device 11 is moved from the virtual volume 21 to the newly created virtual volume 22.

Though the number of storage devices is zero at the time point when the virtual volume 22 is created, the process at the above-mentioned step 616 completes the movement of the first storage device.

Then, the flowchart in FIG. 10 is used to explain an example of moving storage devices at the above-mentioned step 616.

At step 641, the process disables one column (e.g., column 31) in the update table for a storage device (e.g., storage device 11) as shown in FIG. 6. This storage device is then detached from the virtual volume 21.

The storage device detached from the virtual volume 21 is then connected to the virtual volume 22 Based on the above-mentioned update tables 34 through 37, the difference for the updated contents is written to the added storage device.

At step 643, it is determined whether or not unmoved storage devices exist in the virtual volume 21. When there are no storage devices left to be moved, the process proceeds to step 644 to remove the virtual volume 21 and the update table 30 through 33, then terminates the processing.

When the virtual volume 21 contains one or more storage devices left, the process terminates.

To update the contents of the site, the storage devices 11 through 13 are moved in a specified increment (one by one in this example) between the virtual volumes 21 and 22. In addition, the access destination is changed on the servers 521 through 525 in a specified increment (one server at a time in this example). Therefore, it is possible to smoothly update the contents in a single shared storage device 1 while responding to the requests from the Internet 50

The plurality of storage devices 11 through 13 in the shared storage device 1 is sequentially moved from the virtual volume 21 storing the old contents to the virtual volume 22 storing the new contents. The new contents are updated in the virtual volume 22 where the storage devices are moved. The shared storage device 1 does not require separate physical storage devices for update as mentioned for the conventional example. Consequently, it is possible to reduce the size and power consumption for the entire site, i.e., for the plurality of servers 521 through 525 (having no storage devices) and also the shared storage device 1.

The density of the entire system is improved due to the reduction in size of the servers 521 through 525 and of the shared storage device 1. Also, when moving the storage devices 11 through 13, the number of storage devices to be moved is determined according to the access load. This makes it possible to minimize the decrease in the site performance when the contents are updated. Unlike the conventional example, it is possible to prevent the access to the site from being interrupted or the site performance from being greatly degraded. Therefore, the present invention allows a highly available site to be constructed.

The present invention is not limited to the above-mentioned embodiments or modifications thereof. Obviously, the present invention can be implemented by the following modifications or other modifications. Further, the present invention can be also implemented by a technology described as the above-mentioned plurality of embodiments or modifications thereof or by a combination of the following modifications.

(Modification 1) The present invention is not limited to data centers and to the front-end layers connected to the Internet 50, and can be applied to information processing devices such as a plurality of servers sharing one or more storage devices.

Figure 11:
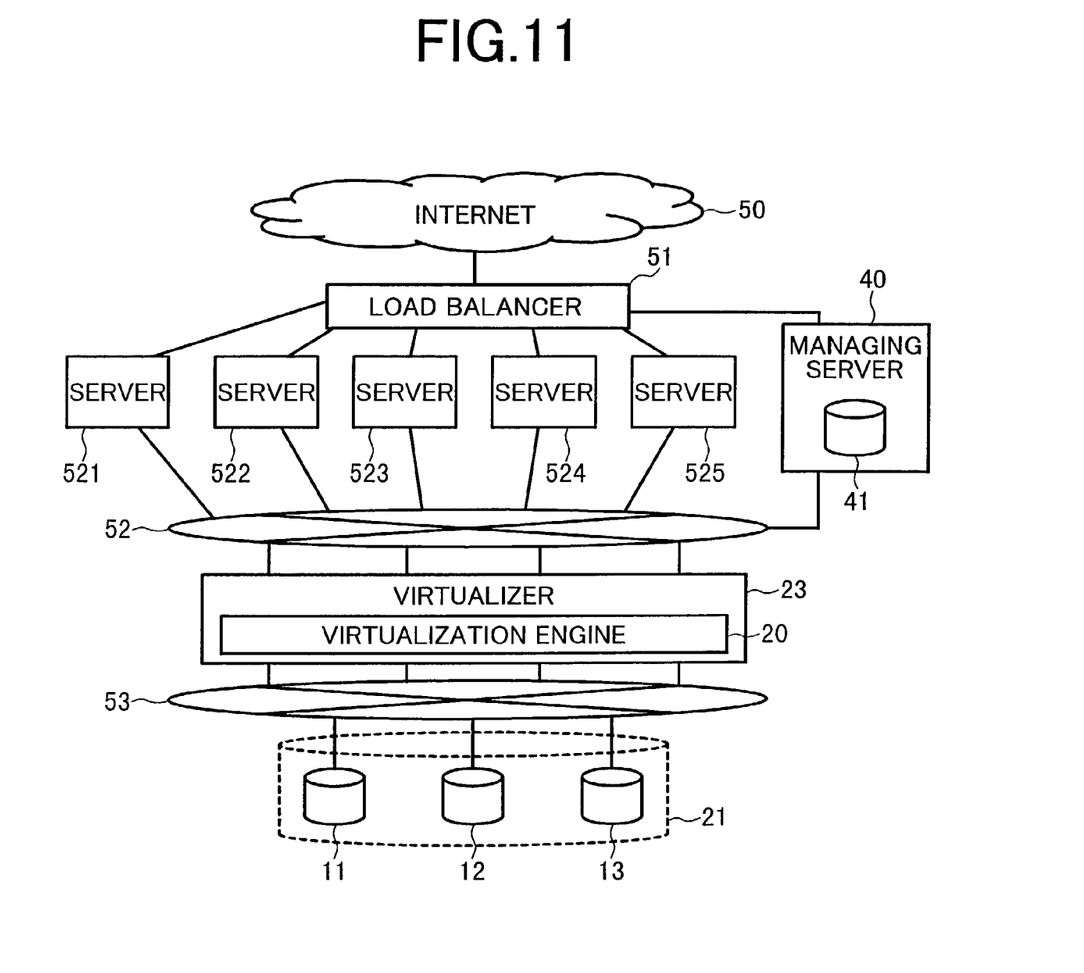
FIG. 11 is the schematic configuration diagram of a Web site according to another embodiment.

(Modification 2) The present invention is not limited to the shared storage device 1 in FIGS. 2 through 6 and may be configured otherwise. For example, the present invention may be configured as shown in FIG. 11. According to this configuration, the virtualization engine 20 is contained in a virtualizer 23. The storage devices 11 through 13 are detached from the virtualizer 23 and are connected via a network 53. The virtualizer 23 accesses a plurality of storage devices 11 through 13 via the network 53.

Figure 12:
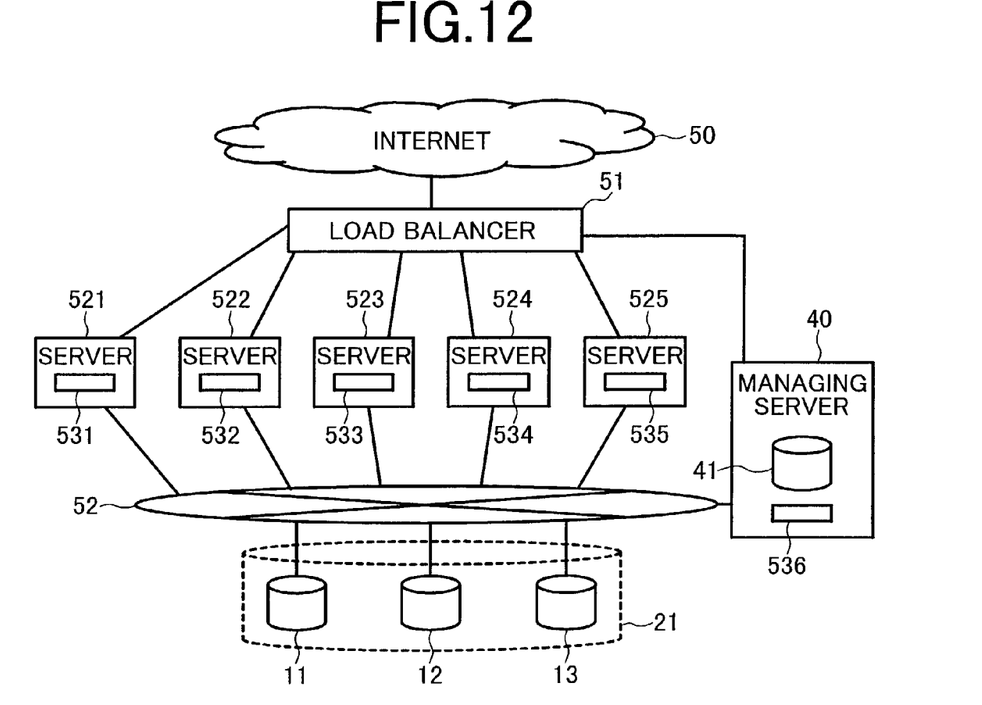
FIG. 12 is the schematic configuration diagram of a Web site according to yet another embodiment.

FIG. 12 shows yet another configuration. According to this configuration, virtualization engines 531 through 536 are provided in the servers 521 through 525 and the managing server 40. Each server is connected to a plurality of storage devices 11 through 13 via a network 52.

Since the virtualization engines 531 through 536 are distributed in this configuration, operations differ from those described in the above-mentioned examples.

Specifically, only the virtualization engine 536 in the managing server 40 has the update tables 30 through 33 and 34 through 37 as shown in FIG. 6.

When creating the virtual volume 22 or moving the storage devices 12 and 13, the managing server 40 needs to issue the virtual volume creation command to the virtualization engines 531 through 536.

These operations are implemented with two steps. When creating the virtual volume 22, as the first step, the storage device 11 is detached on the virtualization engines 531 through 536. As the second step, the virtual volume 22 is implemented.

When moving the storage devices 12 and 13, as the first step, the storage devices 12 and 13 are detached on the virtualization engines 531 through 535. As the second step, a difference between the old and new contents is written to the storage devices 12 and 13, and then the storage devices 12 and 13 are moved to the virtual volume 22. All contents are updated in each of the above-mentioned updates, i.e., the operation fills all check marks in all columns of the update tables 30 through 33 and 34 through 37 for the storage devices 11 through 13 updated while there are no accesses from the servers 521 through 525. All the contents of the storage devices 11 through 13 have to be updated because the servers 521 through 525 do not have the update tables 30 through 33 and 34 through 37.

(Modification 3) While the explanations above describe a shared storage device 1 containing three storage devices 11 through 13, the present invention is not limited thereto. It is possible to specify any number of storage devices for the storage devices 11 through 13. Two or more storage devices can implement the present invention.

(Modification 4) According to the above-mentioned embodiments, as shown in FIGS. 15, 1, 11, and 12, the servers 521 through 525 are connected to the storage devices 11 through 13 via the networks 52 and 53. However, these servers 521 through 525 can be directly connected with the storage devices 11 through 13 instead of through a network. Also, a network may be used to implement the connections among the load balancer 51 and the servers 521 through 525.

(Modification 5) While there have been described a RAID-1 implementation as explained with reference to FIGS. 5 and 6, the present invention is not limited thereto and can be applied to the other RAID-1 implementations.

(Modification 6) In the above-mentioned embodiments, the storage devices 11 through 13 are not limited to disks. For example, each of the storage devices 11 through 13 may further comprise a RAID system. For example, Hitachi's HOMRCF (Hitachi Open Multiple RAID Coupling Feature) implements mirroring equivalent to the RAID-1 between a plurality of volumes. Moreover, each volume can be configured to be the a RAID volume (see the "HOMRCF User's Guide").

(Modification 7) The description of operations in FIG. 6 assumes that the virtual volume 21 is not updated after the virtual volume 22 is created. If the virtual volume 21 is updated, however, it is necessary to clear not only check marks for the columns (32 and 33 in FIG. 6) in the update tables for the storage devices (12 and 13 in FIG. 6) in the virtual volume 21, but also the columns (36 and 37 in FIG. 6) corresponding to the virtual volume 22 before writing. Consequently, when the storage devices (12 and 13 in FIG. 6) are moved to the virtual volume 22, these blocks are changed back to the contents of the virtual volume 22.

(Modification 8) While it has been described that the managing server 40 issues commands to the virtualization engines 20 and 531 through 535 to move the storage devices 12 and 13 between the virtual volumes 21 and 22, the present invention is not limited to this operation. For example, the virtualization engines 20 and 531 through 535 may measure access loads to the virtual volumes 21 and 22, and/or count the number of the servers 521 through 525 accessing the virtual volumes 21 and 22. A given function of this load and/or this number of servers may be used to determine the number of storage devices 11 through 13 for the virtual volumes 21 and 22.

As examples of this function, it may be first considered to change the number of storage devices 11 through 13 in proportion to the access loads to the virtual volumes 21 and 22. Further, it may also be considered to measure the increase in the loads and estimate a time point for the movement.

Figure 13:
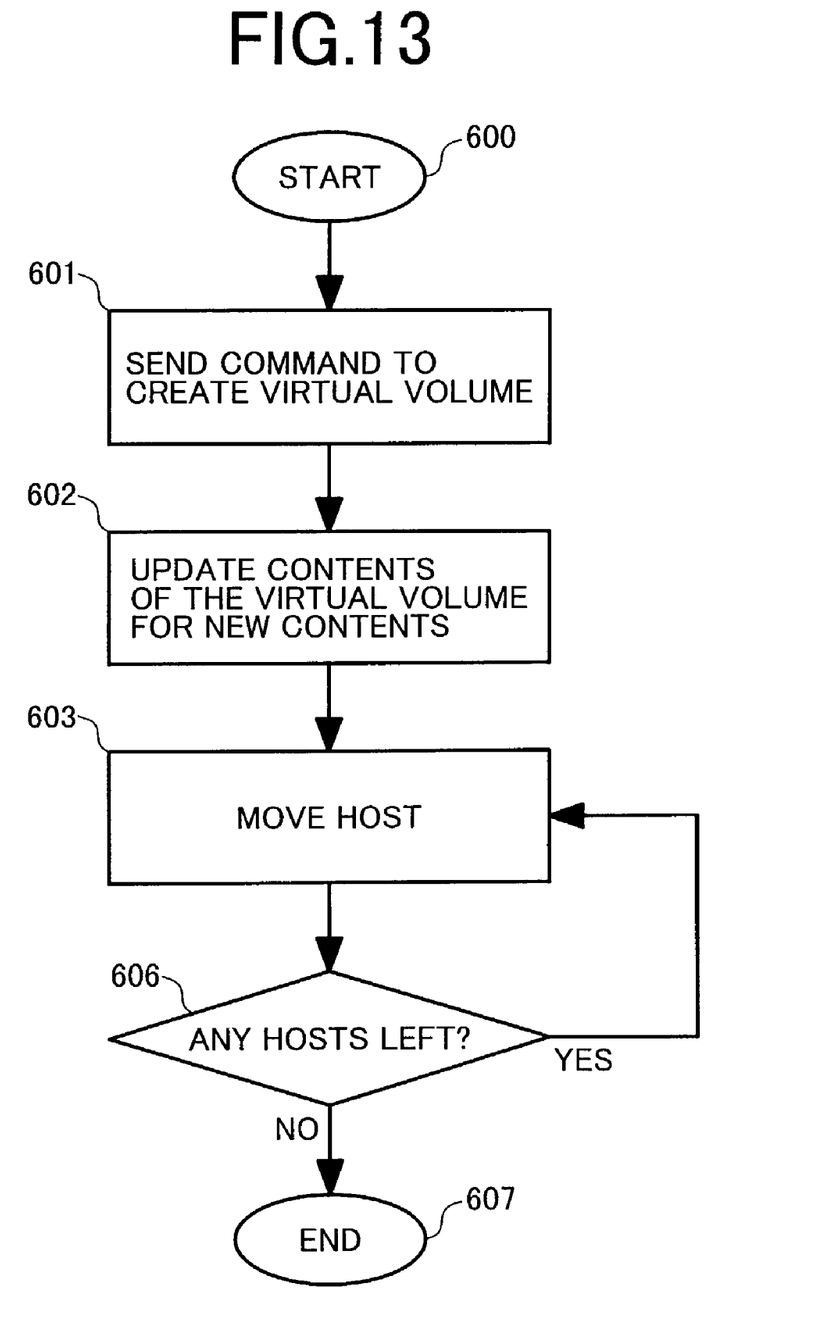
FIG. 13 is a flowchart showing an example of processing in the managing server according to yet another embodiment.
Figure 14:
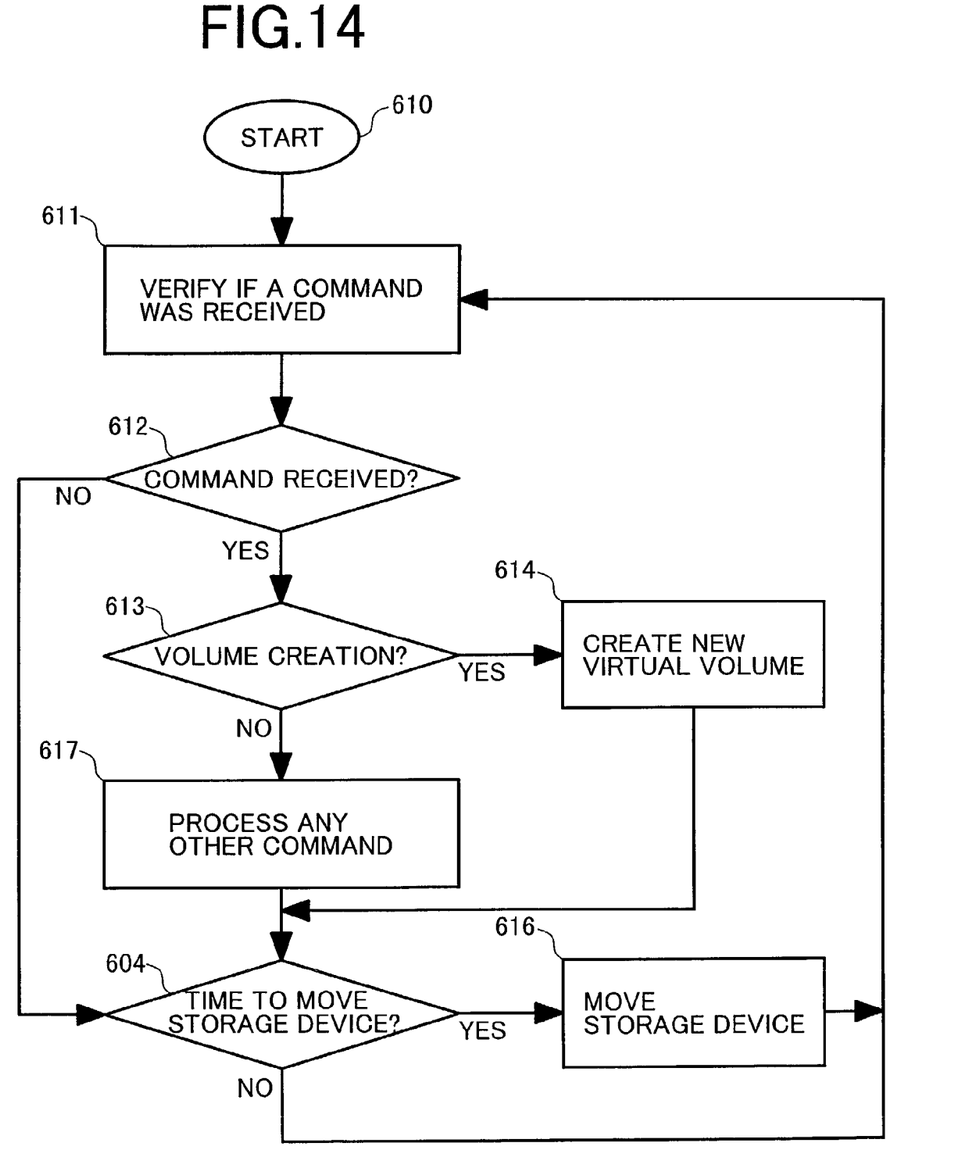
FIG. 14 is a flowchart showing an example of the processing in the virtualization engine according to yet another embodiment.

The flowcharts in FIGS. 13 and 14 show processes performed in the managing server 40 and the servers 521 through 525 according to the configuration of this modification.

FIG. 13 shows a process in the managing server 40. This process is equivalent to the flowchart in FIG. 7 when steps 604 and 605 are removed from it. The process issues a command for creating the virtual volume 22 to the virtualization engines 20 and 531 through 535, and then updates the contents of the virtual volume 22. The process then uses the load balancer 51 to control routing, sequentially detaching and reattaching the servers 521 through 525 from the site, and meanwhile changes the virtual volume to be accessed.

FIG. 14 shows a process performed in the virtualization engines 20 and 531 through 535. This process is equivalent to the flowchart in FIG. 8, with step 615 removed, and step 617 being followed by step 604 (see FIG. 7).

If the managing server 40 issues no command, the process computes the condition for moving the storage devices 12 and 13 at step 604. If this condition is satisfied, the process moves the storage device at step 616. If this condition is not satisfied, the process returns to step 611 to repeat the loop.

(Modification 9) While the above-mentioned embodiments have shown the storage devices 11 through 13 as block storage devices, the present invention is not limited to this embodiment. For example, the present invention can be applied to file-based storage devices (NAS: Network-Attached Storage). As an example of implementing such a NAS device, update tables 30 through 33 may be created for each file. In this case, the block column 30 indicates the blocks within the file. When the virtual volume 22 is created, all the update tables 30 through 33 are copied. When a file is deleted, the corresponding update tables 30 through 33 are deleted.

(Modification 10) The above-mentioned embodiment has described the example of moving the storage devices one by one to the new virtual volume. It is also possible to move a plurality of storage devices to create the new virtual volume 22 and to move a plurality of storage devices between the virtual volumes 21 and 22. A plurality of storage devices may be detached from the virtual volume 21 to create the new virtual volume 22 from these storage devices. Thereafter, it may be preferable to move a plurality of storage devices from the virtual volume 21 to the virtual volume 22.

A program for implementing the present invention can be sold independently or in combination with the other programs stored in program storage media such as disk storage devices, etc. The program for implementing the present invention may be an add-on program to an already used communication program or may be a program that replaces part of the communication program.

The program may be a storage method characterized by generating the above-mentioned second volume based on at least one of a command received from the outside and setup information.

The program may be a storage method characterized by moving a storage mechanism detached from the above-mentioned first volume to the above-mentioned second volume and writing a difference of saved data based on at least one of a command received from the outside and setup information.

The program may be a storage method characterized by generating the above-mentioned second volume based on at least one of a transmitted command and setup information.

The program may be storage method characterized by moving a storage mechanism detached from the above-mentioned first volume to the above-mentioned second volume and writing a difference of saved data based on at least one of a transmitted command and setup information.

The presently disclosed embodiments should be considered to be examples in all aspects, but not to be restrictive. The scope of the present invention is intended to be defined by the appended claims rather than by the description preceding them and to include all changes within the scope of meanings and contents equivalent to the claims.

What is claimed is:

1. A contents update method in a storage system including a plurality of storage mechanisms that respectively save the same data as contents of a first virtual volume, said method comprising the steps of:
   a) detaching a first storage mechanism of said plurality of storage mechanisms from the first virtual volume and moving said first storage mechanism to a new second virtual volume, while data saved in said first storage mechanism are unchanged, by renaming the volume name for said first storage mechanism;
   b) updating the data saved in said first storage mechanism; and
   c) repeating said step a) and said step b) for each of said plurality of storage mechanisms in said first virtual volume to gradually increase the updated contents until all of said storage mechanisms are finally detached from the first virtual volume and are made respectively to store data as contents of the second virtual volume containing updated data.

2. The contents update method according to claim 1, further comprising a step of gradually increasing a number of servers that access said second virtual volume as said step c) progresses.

3. A contents update method according to claim 1, wherein the contents of said first virtual volume saved in said storage mechanisms are managed under an update table which contains update information of data blocks for each of said storage mechanisms, and, wherein the contents update method further comprises the step, before said step a), of duplicating said update table for managing contents of said second virtual volume.

4. A contents update method according to claim 3, wherein said step b) is performed by updating data blocks that are marked as data blocks to be updated on the duplicated update table.

5. A contents update method according to claim 1, wherein said storage mechanisms of said first virtual volume, before being detached in said step a), are accessible by a plurality of servers;

wherein accessibility by said plurality of servers to the storage mechanisms of said first virtual volumes moves to accessibility by said plurality of servers to corresponding storage mechanisms of said second virtual volume in accordance with said detaching and moving of said storage mechanisms fmm said first virtual volume to said second virtual volume; and wherein accessibility by said plurality of servers to said storage mechanisms of said first virtual volume that have not yet been moved to said second virtual volume continues during said detaching and moving steps.

6. A contents update method implemented in a storage system including a plurality of storage mechanisms that respectively save the same data as contents of a first virtual volume, said method comprising the steps of:

a) determining whether to generate a second virtual volume as an updated substitution for the first virtual volume;

b) detaching a first storage mechanism of said plurality of storage mechanisms from the first virtual volume and moving said first storage mechanism to the second virtual volume while data saved in said first storage mechanism are unchanged, by renaming the volume name for said first storage mechanism;

c) updating data saved in said first storage mechanism by writing the data difference between said first virtual volume and said updated substitution in said first storage mechanism;

d) repeating said step b) and said step c) for each of said storage mechanisms to gradually increase the updated contents until all of said storage mechanisms are finally detached from the first virtual volume and are made respectively to store data as contents of the updated second virtual volume.

7. A contents update method according to claim 6, wherein said storage mechanisms of said first virtual volume, before being detached in said step a), are accessible by a plurality of servers;

wherein accessibility by said plurality of servers to the storage mechanisms of said first virtual volumes moves to accessibility by said plurality of servers to corresponding storage mechanisms of said second virtual volume in accordance with said detaching and moving of said storage mechanisms from said first virtual volume to said second virtual volume; and wherein accessibility by said plurality of servers to said storage mechanisms of said first virtual volume that have not yet been moved to said second virtual volume continues during said detaching and moving steps.

* * * * *